US008789142B2

(12) United States Patent
    Chiu

(10) Patent No.: US 8,789,142 B2
(45) Date of Patent: Jul. 22, 2014

(54) SYSTEM FOR PROVIDING LEARNING ACCORDING TO GLOBAL POSITIONING INFORMATION AND METHOD THEREOF

(71) Applicant: Inventec (Pudong) Technology Corporation, Shanghai (CN)

(72) Inventor: Chaucer Chiu, Shanghai (CN)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 13/795,516

(22) Filed: Mar. 12, 2013

(65) Prior Publication Data
    US 2014/0150062 A1    May 29, 2014

(30) Foreign Application Priority Data
    Nov. 29, 2012  (CN) .......................... 2012 1 0501627

(51) Int. Cl.
    *G06F 7/04*      (2006.01)
    *G06F 15/16*     (2006.01)

(52) U.S. Cl.
    USPC ................ 726/3; 709/203; 709/217; 707/10; 434/362

(58) Field of Classification Search
    None
    See application file for complete search history.

(56) References Cited

U.S. PATENT DOCUMENTS

| 8,380,121 | B2 * | 2/2013 | Bradford et al. | 434/350 |
| 2003/0129576 | A1 * | 7/2003 | Wood et al. | 434/362 |
| 2003/0145005 | A1 * | 7/2003 | Blair et al. | 707/10 |
| 2004/0009462 | A1 * | 1/2004 | McElwrath | 434/350 |
| 2005/0214732 | A1 * | 9/2005 | Wen et al. | 434/350 |
| 2006/0147890 | A1 * | 7/2006 | Bradford et al. | 434/362 |
| 2011/0029591 | A1 * | 2/2011 | Wood et al. | 709/203 |
| 2011/0055348 | A1 * | 3/2011 | Black | 709/217 |
| 2011/0270873 | A1 * | 11/2011 | Somanchi et al. | 707/769 |
| 2013/0073957 | A1 * | 3/2013 | DiGiantomasso et al. | 715/705 |
| 2013/0297675 | A1 * | 11/2013 | Li et al. | 709/203 |

* cited by examiner

*Primary Examiner* — Fikremariam A Yalew
(74) *Attorney, Agent, or Firm* — Bacon & Thomas, PLLC

(57) ABSTRACT

A system for providing learning according to global positioning information and a method thereof are provided. A server queries for a corresponding learning content according to global positioning information provided by a first client, so that a student can learn anytime and anywhere. The server records contents already learnt by the student. A corresponding test type and test content are provided for a second client, and selection is performed to generate a test paper, which is provided for the first client so that the student can take a test. Therefore, learning anytime and anywhere is enabled, thereby achieving the technical effect of optimal learning efficiency.

8 Claims, 4 Drawing Sheets

| Coordinate range | Learning content | Test type | Test content | Learning record |
|---|---|---|---|---|
| ... | | | | ... |
| 121°45'38" E, 31°27'17" N<br>121°51'38" E, 31°27'17" N<br>121°45'38" E, 31°23'17" N<br>121°51'38" E, 31°23'17" N | History of a historical site A | Blank-filling type | Blank-filling question | 123456789 |
| | | True-or-false type | True-or-false question | |
| ... | | | | ... |

SYSTEM FOR PROVIDING LEARNING ACCORDING TO GLOBAL POSITIONING INFORMATION AND METHOD THEREOF

BACKGROUND OF THE INVENTION

1. Field of the Invention

The present invention relates to a learning system and a method thereof, and more particularly to a system for providing learning according to global positioning information and a method thereof.

2. Description of Related Art

Learning any interesting thing anytime and anywhere is regarded as a most efficient way of learning. However, in the early period, due to the limited development of science and technology, it is impossible to learn something interesting anytime and anywhere, and learning can only be done in schools.

However, with the rapid development of science and technology, various portable devices are developed, such as smart phones, notebook computers, and tablet computers. The portable devices provide functions to enable a user in movement to inquire data, receive/send E-mails, perform mobile communication, and so on.

Therefore, if a portable device can be used to enable learning of interesting things anytime and anywhere and provide a learning test in real time, in addition to that a most efficient way of learning is achieved, students can not only read thousands of books but also travel thousands of miles.

In view of the above, it can be seen that the prior art has long had the problem of the failure in achieving optimal learning efficiency due to incapability of enabling learning anytime and anywhere, so that it is necessary to provide technical means for improvement, so as to solve the problem.

SUMMARY OF THE INVENTION

In view of that the prior art has the problem of failure in achieving optimal learning efficiency due to incapability of enabling learning anytime and anywhere, the present invention provides a system for providing learning according to global positioning information and a method thereof.

The present invention provides a system for providing learning according to global positioning information, which includes a server and a first client. The server includes a learning database, a server reception module, an authentication module, a rights management module, a query module, a recording module, and a server transmission module. The first client includes a first connection module and a first display module.

The learning database of the server is used for storing multiple pieces of learning data. Each piece of learning data includes a coordinate range, a learning content, and a learning record. The server reception module of the server is used for receiving authentication information and global positioning information. The authentication module of the server is used for performing authentication on the authentication information. The rights management module of the server is used for, when the authentication information passes the authentication performed by the authentication module, granting a corresponding right according to the authentication information. The query module of the server is used for, when the rights management module grants a first right according to the authentication information, querying the learning database for the learning content corresponding to the global positioning information located in the coordinate range. The recording module of the server is used for recording the authentication information into the learning record corresponding to the learning content. The server transmission module of the server is used for transmitting the learning content.

The first connection module of the first client is used for establishing a connection to the server, providing the authentication information and the global positioning information for the server reception module, and obtaining the learning content from the server transmission module. The first display module of the first client is used for displaying the learning content and a test paper.

The present invention provides a method for providing learning according to global positioning information, which includes the following steps.

First, a learning database storing multiple pieces of learning data is pre-established in a server, and each piece of learning data includes a coordinate range, a learning content, and a learning record. A first client establishes a connection to the server, and provides authentication information and global positioning information for the server. When the authentication information passes authentication performed by the server, a corresponding right for the first client is granted according to the authentication information. When the server grants a first right according to the authentication information, the learning database is queried for the learning content corresponding to the global positioning information located in the coordinate range. Finally, the server provides the learning content for the first client for displaying, and records the authentication information into the learning record corresponding to the learning content.

The system and method provided by the present invention are described above, and differences between the present invention and the prior art are as follows. In the present invention, the server performs querying according to the global positioning information provided by the first client, so as to determine the learning content corresponding to the global positioning information, so that a student can learn anytime and anywhere, thereby improving learning efficiency of the student.

Through the above technical means, the present invention can enable learning anytime and anywhere, so as to achieve the technical effect of optimal learning efficiency.

BRIEF DESCRIPTION OF THE DRAWINGS

The invention will become more fully understood from the detailed description given herein below illustration only, and thus is not limitative of the present invention, and wherein:

FIG. 3 is a schematic view of a learning database for providing learning according to global positioning information according to the present invention.

DESCRIPTION OF THE EMBODIMENTS

Implementation of the present invention is illustrated below in detail with reference to the drawings and embodiments, so as to enable an implementation process, in which the present invention applies the technical means to solve the technical problem and achieve the technical effect, to be fully understood and implemented accordingly.

Figure 1:
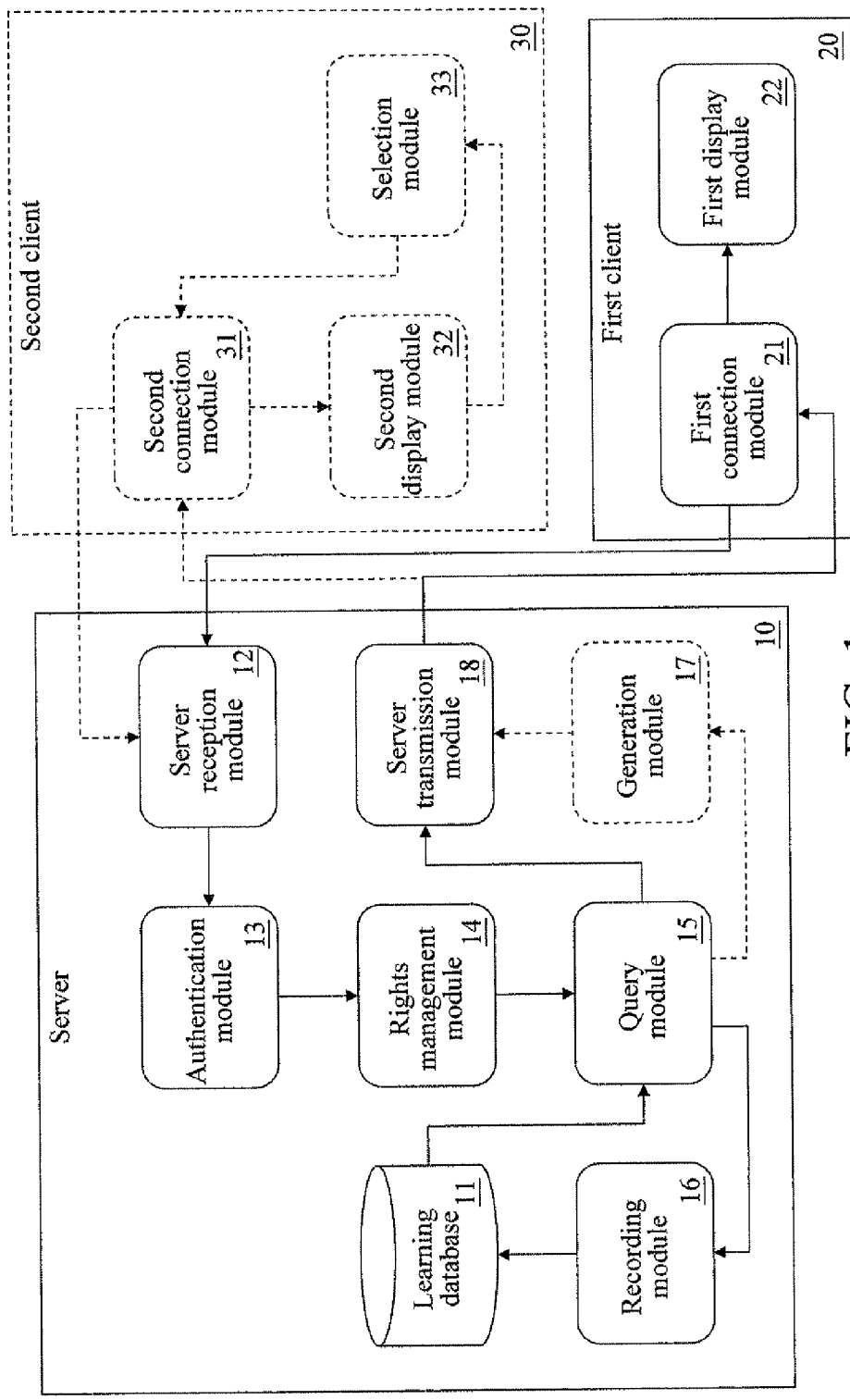
FIG. 1 is a block diagram of a system for providing learning according to global positioning information according to the present invention.

A system, provided by the present invention, for providing learning according to global positioning information is illustrated below first. Referring to FIG. 1, FIG. 1 is a block diagram of a system for providing learning according to global positioning information according to the present invention.

The present invention provides a system for providing learning according to global positioning information, which includes a server 10, a first client 20, and a second client 30. The server 10 includes a learning database 11, a server reception module 12, an authentication module 13, a rights management module 14, a query module 15, a recording module 16, and a server transmission module 18. The first client 20 includes a first connection module 21 and a first display module 22.

The learning database 11 storing multiple pieces of learning data is pre-established in the server 10. Each piece of learning data stored in the learning database 11 includes a coordinate range, a learning content, and a learning record. The coordinate range is implemented through global positioning information. The learning content may be, for example, history of a historical site, a description of a cultural relic, or a description of an animal. The learning record is a record recording whether a student has learnt the learning content. The above descriptions are only exemplary, and are not intended to limit the application scope of the present invention.

The first client 20 is a portable device held by the student. The first client 20 is, for example, a smart phone, a notebook computer, or a tablet computer. The first connection module 21 of the first client 20 establishes a connection to the server 10. The first connection module 21 of the first client 20 provides authentication information and global positioning information for the server reception module 12 of the server 10. The first connection module 21 of the first client 20 may establish the connection to the server 10 through a wireless fidelity (WIFI) wireless network, Bluetooth, or a 3rd-generation (3G) mobile communication technology, which are only exemplary herein and are not intended to limit the application scope of the present invention.

The authentication information may be pre-stored in the first client 20, or the authentication information is input by the student through a user interface provided by the first client 20. The authentication information may be a combination of a student name and a password, a combination of a student number and a password, and a student authentication code, which are only exemplary herein and are not intended to limit the application scope of the present invention. The global positioning information is obtained through a global positioning system (GPS) or a location based service (LBS) of the first client 20.

After the server reception module 12 of the server 10 receives the authentication information and the global positioning information provided by the first connection module 21 of the first client 20, the authentication module 13 of the server 10 performs authentication on the authentication information, that is, determines whether the authentication information is the same as standard information. When the authentication information is the same as the standard information, the authentication information passes the authentication performed by the authentication module 13 of the server 10; on the contrary, if the authentication information is not the same as the standard information, the authentication information cannot pass the authentication performed by the authentication module 13 of the server 10.

When the authentication information passes the authentication performed by the authentication module 13 of the server 10, the rights management module 14 of the server 10 grants a corresponding right according to the authentication information. The authentication information includes the student name, the student number, or the student authentication code, so that the rights management module 14 of the server 10 grants a first right (that is, a student right) to the authentication information.

Then, the query module 15 of the server 10 may query, according to the first right granted by the rights management module 14 of the server 10 to the authentication information, the learning database 11 of the server 10 for a learning content corresponding to the global positioning information located in the coordinate range.

Specifically, it is assumed that the global positioning information received by the server reception module 12 of the server 10 is "121°48'38" E, 31°25'17" N", the rights management module 14 of the server 10 grants the first right according to the authentication information, a coordinate range of a piece of data in the learning database 11 of the server 10 is "121°45'38" E, 31°27'17" N", "121°51'38" E, 31°27'17" N", "121°45'38" E, 31°23'17" N", and "121°51'38" E, 31°23'17" N", and the learning content is "history of a historical site A".

The query module 15 of the server 10 determines that the global positioning information being "121°48'38" E, 31°25'17" N" is located in the coordinate range being "121°45'38" E, 31°27'17" N", "121°51'38" E, 31°27'17" N", "121°45'38" E, 31°23'17"N", and "121°51'38" E, 31°23'17" N", and determines that the corresponding learning content is "history of the historical site A".

Then, the recording module 16 of the server 10 records the authentication information in a learning record corresponding to the learning content, so as to indicate that the student has learnt the learning content. According to the aforementioned example, it is assumed that the authentication information includes the student number being "123456789", and the recording module 16 of the server 10 may record the student number being "123456789" into the learning record corresponding to the learning content being "history of the historical site A".

After the query module 15 of the server 10 determines the learning content, the server transmission module 18 of the server 10 transmits the learning content to the first client 20, the first connection module 21 of the first client 20 obtains the learning content transmitted by the server transmission module 18 of the server 10, and the first display module 22 of the first client 20 displays the learning content, so that the student can learn anywhere.

Each piece of learning data in the learning database 11 of the server 10 further includes a test type and a test content corresponding to the test type. The test type may be a choice type, a blank-filling type, a true-or-false type, a short-answer type, and so on. For different test types, the learning content may be a test content corresponding to the test type. The above illustration is only exemplary, and is not intended to limit the application scope of the present invention.

The system for providing learning according to global positioning information may further include the second client 30. The second client 30 includes a second connection module 31, a second display module 32, and a selection module 33. The second client 30 is an electronic device held by a teacher. The second client 30 is, for example, a desktop computer, a smart phone, a notebook computer, or a tablet computer. The second connection module 31 of the second client 30 establishes a connection to the server 10. The second connection module 31 of the second client 30 provides authentication information for the server reception module 12 of the server 10. The second connection module 31 of the second client 30 may establish the connection to the server 10 through a wired network, a WIFI wireless network, Bluetooth, or a 3G mobile communication technology, which are only exemplary herein and are not intended to limit the application scope of the present invention.

The authentication information may be pre-stored in the second client 30, or the authentication information is input by the teacher through a user interface provided by the second client 30. The authentication information may be a combination of a teacher name and a password, a combination of a teacher number and a password, and a teacher authentication code, which are only exemplary herein and are not intended to limit the application scope of the present invention.

After the server reception module 12 of the server 10 receives the authentication information provided by the second connection module 31 of the second client 30, the authentication module 13 of the server 10 performs authentication on the authentication information, that is, determines whether the authentication information is the same as standard information. When the authentication information is the same as the standard information, the authentication information passes the authentication performed by the authentication module 13 of the server 10; on the contrary, if the authentication information is not the same as the standard information, the authentication information cannot pass the authentication performed by the authentication module 13 of the server 10.

When the authentication information passes the authentication performed by the authentication module 13 of the server 10, the rights management module 14 of the server 10 grants a corresponding right according to the authentication information. The authentication information includes the teacher name, the teacher number, or the teacher authentication code, so that the rights management module 14 of the server 10 grants a second right (that is, a teacher right) to the authentication information.

Then, the query module 15 of the server 10 may query, according to the second right granted by the rights management module 14 of the server 10 to the authentication information, the learning database 11 of the server 10 for a test type corresponding to a learning record and a test content corresponding to the test type.

Specifically, a learning record of a piece of data in the learning database 11 of the server 10 records a student number being "123456789", and in this case, the query module 15 of the server 10 determines that test types corresponding to the learning record are the "blank-filling type" and the "true-or-false type", determines that a test content corresponding to the test type being the "blank-filling type" is a "blank-filling question", and determines that a test content corresponding to the test type being the "true-or-false type" is a "true-or-false question".

A learning record of another piece of data in the learning database 11 of the server 10 records a student number being "987654321", and in this case, the query module 15 of the server 10 determines that test types corresponding to the learning record are the "choice type" and the "short-answer type", determines that a test content corresponding to the test type being the "choice type" is a "choice question", and determines that a test content corresponding to the test type being the "short-answer type" is a "short-answer question".

Then, the server transmission module 18 of the server 10 transmits the test types, determined by the query module 15 of the server 10, corresponding to the learning record and the test contents corresponding to the test types to the second client 30. The second connection module 31 of the second client 30 obtains the test types and the test contents corresponding to the test types which are transmitted by the server transmission module 18 of the server 10. The second display module 32 of the second client 30 displays the test types and the test contents corresponding to the test types, so that the teacher may select the test contents rapidly and conveniently.

Then, the teacher may perform selection on the test types and the test contents corresponding to the test types which are displayed on the second display module 32 of the second client 30. The selection module 33 of the second client 30 uses a selected test type and the text content corresponding to the test type as selection information. The second connection module 31 of the second client 30 provides the selection information for the server 10.

After the server reception module 12 of the server 10 receives the selection information, a generation module 17 of the server 10 generates a test paper according to the test type and the test content corresponding to the test type and according to the selection information. The server transmission module 18 of the server 10 transmits the test paper to the corresponding first client 20, so that the teacher can generate a test paper rapidly and conveniently.

After the first connection module 21 of the first client 20 obtains the test paper transmitted by the server transmission module 18 of the server 10, the first display module 22 of the first client 20 displays the test paper, so that the student can take a test after learning.

Figure 2:
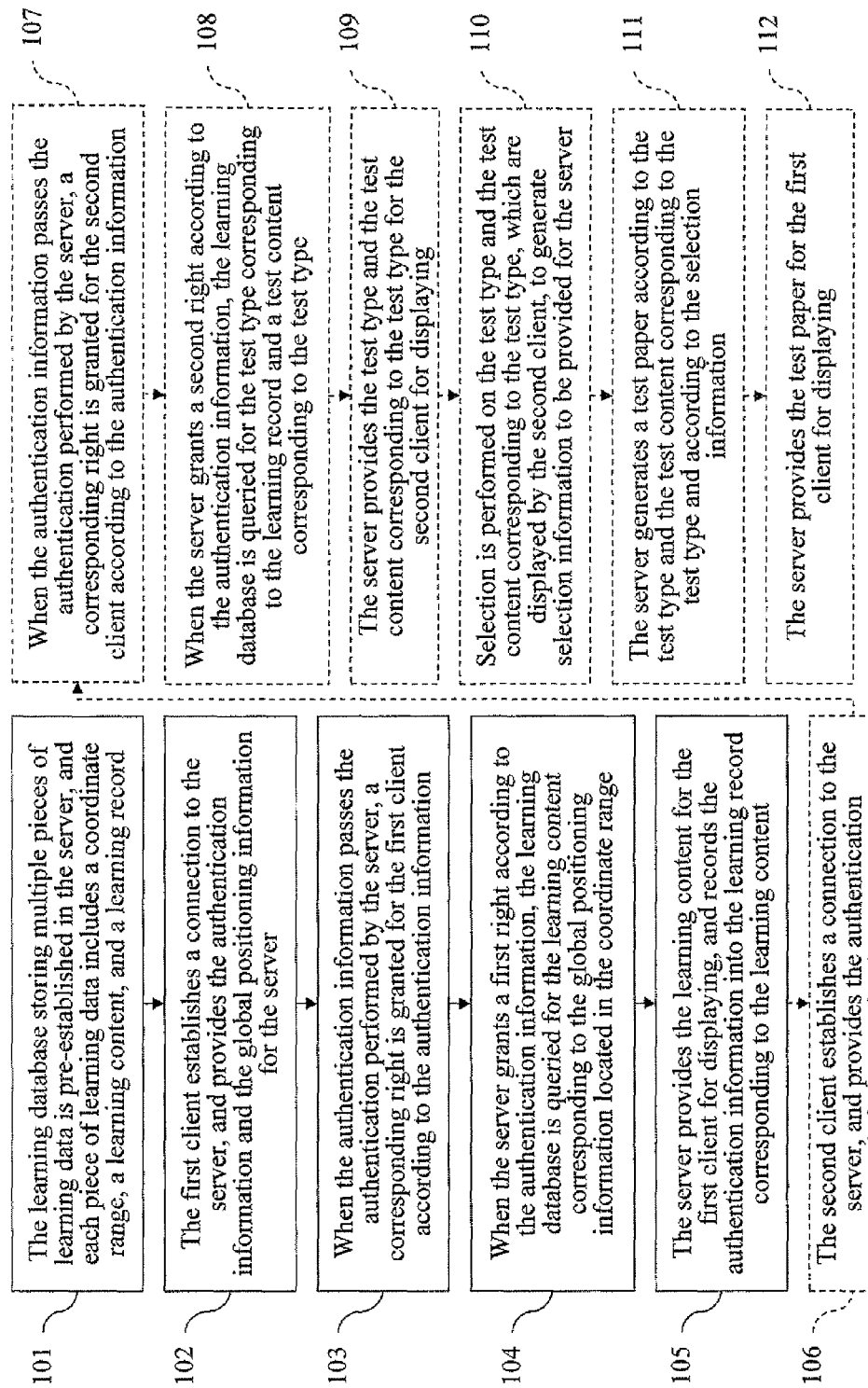
FIG. 2 is a flow chart of a method for providing learning according to global positioning information according to the present invention.

An operation manner and process of the present invention is illustrated below through an embodiment. The following embodiment is illustrated with reference to FIG. 1, FIG. 2, and FIG. 3. FIG. 2 is a flow chart of a method for providing learning according to global positioning information according to the present invention. FIG. 3 is a schematic view of a learning database for providing learning according to global positioning information according to the present invention.

The learning database 11 storing multiple pieces of learning data is pre-established in the server 10, and each piece of learning data stored in the learning database 11 includes a coordinate range 111, a learning content 112, a test type 113, a test content 114 corresponding to the test type, and a learning record 115 (Step 101), the contents of which are as shown in FIG. 3.

Figure 4:
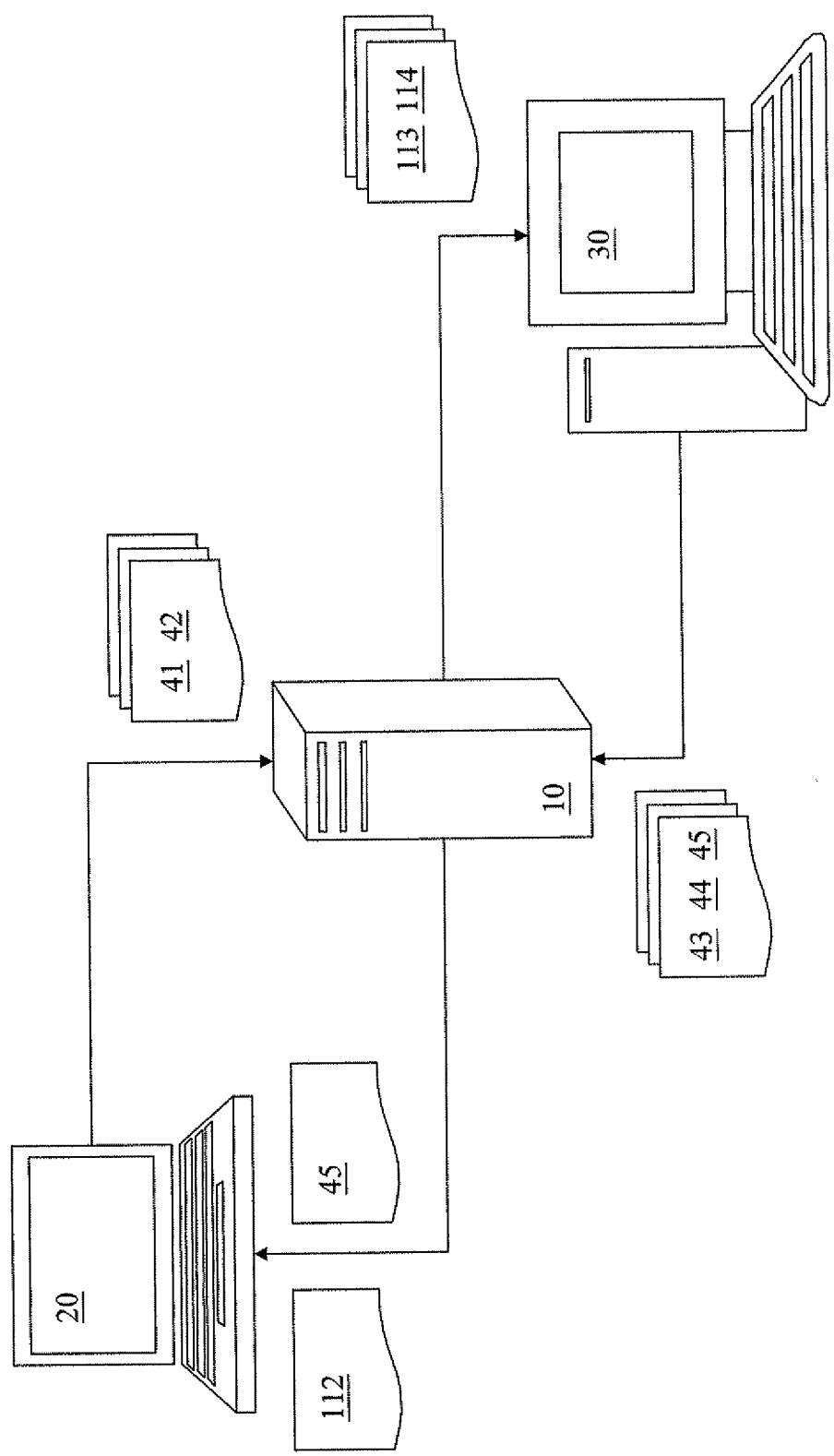
FIG. 4 is a schematic architectural view of providing learning according to global positioning information according to the present invention.

Referring to FIG. 4, FIG. 4 is a schematic architectural view of providing learning according to global positioning information according to the present invention.

The first client 20 is a portable device held by a student. Authentication information 41 pre-stored in the first client 20 is a student number being "123456789" and a password being "ABC123", global positioning information 42 obtained by a GPS of the first client 20 is "121°48'38" E, 31°25'17" N", and the first connection module 21 of the first client 20 establishes a connection to the server 10 through a WIFI wireless network, so as to provide the authentication information 41 and the global positioning information 42 for the server 10 (Step 102).

After the server reception module 12 of the server 10 receives the authentication information 41 and the global positioning information 42 provided by the first connection module 21 of the first client 20, the authentication module 13 of the server 10 performs authentication on the authentication information 41. In the embodiment, the authentication information 41 is the same as standard information, that is, the authentication information 41 passes the authentication performed by the authentication module 13 of the server 10.

When the authentication information 41 passes the authentication performed by the authentication module 13 of the server 10, the rights management module 14 of the server 10 grants, according to the student number being "123456789" in the authentication information 41, a right being a "first right" (that is, a student right, Step 103).

Then, the query module 15 of the server 10 determines, according to the first right granted by the rights management module 14 of the server 10 to the authentication information 41 and by querying the learning database 11 of the server 10, that the global positioning information 42 being "121°48'38" E, 31°25'17" N" is located in the coordinate range 111 being "121°45'38" E, 31°27'17" N", "121°51'38" E, 31°27'17" N", "121°45'38"E, 31°23'17" N", and "121°51'38" E, 31°23'17" N", and determines that the corresponding learning content 112 is "history of a historical site A" (Step 104).

Then, the recording module 16 of the server 10 records the student number being "123456789" of the authentication information 41 into the learning record 115 corresponding to the learning content 112 being the "history of the historical site A" (Step 105), so as to indicate that the student has learnt the learning content.

After the query module 15 of the server 10 determines that the learning content 112 is the "history of the historical site A", the server transmission module 18 of the server 10 transmits the learning content 112 being the "history of the historical site A" to the first client 20, the first connection module 21 of the first client 20 obtains the learning content 112 being the "history of the historical site A" transmitted by the server transmission module 18 of the server 10, and the first display module 22 of the first client 20 displays the learning content 112 being the "history of the historical site A" (Step 105), so that the student can learn anywhere.

The second client 30 is an electronic device held by a teacher. Authentication information 43 being a teacher authentication code being "XYZ789" is pre-stored in the second client 30, and the second connection module 31 of the second client 30 establishes a connection to the server 10 through a wired network, so as to provide the authentication information 43 for the server 10 (Step 106).

After the server reception module 12 of the server 10 receives the authentication information 43 provided by the second connection module 31 of the second client 30, the authentication module 13 of the server 10 performs authentication on the authentication information 43. In the embodiments, the authentication information 43 is the same as standard information, that is, the authentication information 43 passes the authentication performed by the authentication module 13 of the server 10.

When the authentication information 43 passes the authentication performed by the authentication module 13 of the server 10, the rights management module 14 of the server 10 grants, according to the teacher authentication code being "XYZ789" in the authentication information 43, a right being a "second right" (that is, a teacher right, Step 107).

Then, the query module 15 of the server 10 determines, according to the second right granted by the rights management module 14 of the server 10 to the authentication information 43 and by querying the learning database 11 of the server 10, that the test types 113, corresponding to "123456789", recorded in the learning record 115 are a "blank-filling type" and a "true-or-false type", determines that the test content 114 corresponding to the test type 113 being the "blank-filling type" is a "blank-filling question", and determines that the test content 114 corresponding to the test type 113 being the "true-or-false type" is a "true-or-false question" (Step 108).

Then, the server transmission module 18 of the server 10 transmits the test types 113, determined by the query module 15 of the server 10, corresponding to "123456789" and recorded in the learning record and the test contents 114 corresponding to the test types 113 to the second client 30; the second connection module 31 of the second client 30 obtains the test types 113 and the test contents 114 corresponding to the test types 113 which are transmitted by the server transmission module 18 of the server 10; the second display module 32 of the second client 30 displays the test types 113 and the test contents 114 corresponding to the test types 113 (Step 109), so that the teacher may select the test contents rapidly and conveniently.

Then, the teacher selects the test content 114 being the "true-or-false question" corresponding to the test type 113 being the "true-or-false type" from the test types 113 and the test contents 114 corresponding to the test types 113 which are displayed by the second display module 32 of the second client 30, the selection module 33 of the second client 30 uses the selected test type 113 and the test content 114 corresponding to the test type 113 as selection information 44, and the second connection module 31 of the second client 30 provides the selection information 44 for the server 10 (Step 110).

After the server reception module 12 of the server 10 receives the selection information 44, the generation module 17 of the server 10 generates a test paper 45 according to the test content 114 being the "true-or-false question" corresponding to the test type 113 being the "true-or-false type" and according to the selection information 44 (Step 111). Then, the server transmission module 18 of the server 10 transmits the test paper 45 to the corresponding first client 20, so that the teacher can generate a test paper rapidly and conveniently.

After the first connection module 21 of the first client 20 obtains the test paper 45 transmitted by the server transmission module 18 of the server 10, the first display module 22 of the first client 20 displays the test paper 45 (Step 112), so that the student can take a test after learning.

In view of the above, it can be seen that the differences between the present invention and the prior art are as follows. In the present invention, the server performs querying according to the global positioning information provided by the first client, so as to determine the learning content corresponding to the global positioning information, so that the student can learn anytime and anywhere. The content already learnt by the student is recorded in the server, so that the teacher obtains, through the second client, from the server the test type and the test content corresponding to the content already learnt by the student. After the teacher selects the test type and the test content, the server generates the test paper, and provides the test paper for the first client to make the student take a test. Therefore, the teacher can generate the test paper rapidly and conveniently, and the student can take the test in real time, thereby effectively improving learning efficiency of the student.

The technical means can solve the problem of failure in achieving the optimal learning efficiency due to incapability of learning anytime and anywhere in the prior art, so as to enable learning anytime and anywhere, thereby achieving the technical effect of optimal learning efficiency.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A system for providing learning according to global positioning information, comprising:
a server, wherein the server comprises:
a learning database, used for storing multiple pieces of learning data, wherein each piece of learning data comprises a coordinate range, a learning content, and a learning record;
a server reception module, used for receiving authentication information and global positioning information;
an authentication module, used for performing authentication on the authentication information;
a rights management module, used for, when the authentication information passes the authentication performed by the authentication module, granting a corresponding right according to the authentication information;
a query module, used for, when the rights management module grants a first right according to the authentication information, querying the learning database for the learning content corresponding to the global positioning information located in the coordinate range;
a recording module, used for recording the authentication information into the learning record corresponding to the learning content; and
a server transmission module, used for transmitting the learning content; and
a first client, wherein the first client comprises:
a first connection module, used for establishing a connection to the server, providing the authentication information and the global positioning information for the server reception module, and obtaining the learning content from the server transmission module; and
a first display module, used for displaying the learning content; and
wherein in the system for providing learning according to global positioning information:
in the server:
each piece of learning data in the learning database further comprises a test type and a test content corresponding to the test type;
the server reception module further receives selection information;
the query module is further used for, when the rights management module grants a second right according to the authentication information, querying the learning database for the test type corresponding to the learning record and a test content corresponding to the test type;
a generation module, used for generating a test paper according to the test type and the test content corresponding to the test type and according to the selection information; and
the server transmission module is used for transmitting the test type and the test content corresponding to the test type, or transmitting the test paper;
in the first client:
the first connection module obtains the test paper from the server transmission module; and
the first display module displays the test paper; and
a second client, wherein the second client comprises:
a second connection module, used for establishing a connection to the server, providing the authentication information and the selection information for the server reception module, and obtaining the test type and the test content corresponding to the test type from the server transmission module;
a second display module, used for displaying the test type and the test content corresponding to the test type; and
a selection module, used for performing selection on the test type and the test content corresponding to the test type, which are displayed by the second display module, so as to generate the selection information.

2. The system for providing learning according to global positioning information according to claim 1, wherein the global positioning information is obtained through a global positioning system (GPS) or a location based service (LBS) of the first client.

3. The system for providing learning according to global positioning information according to claim 1, wherein the authentication information is pre-stored in the first client, or is input through a user interface provided by the first client.

4. The system for providing learning according to global positioning information according to claim 1, wherein the authentication information is pre-stored in the second client, or is input through a user interface provided by the second client.

5. A method for providing learning according to global positioning information, comprising the following steps:
pre-establishing a learning database storing multiple pieces of learning data in a server, wherein each piece of learning data comprises a coordinate range, a learning content, and a learning record;
a first client establishing a connection to the server, and providing authentication information and global positioning information for the server;
when the authentication information passes authentication performed by the server, granting a corresponding right for the first client according to the authentication information;
when the server grants a first right according to the authentication information, querying the learning database for the learning content corresponding to the global positioning information located in the coordinate range; and
the server providing the learning content for the first client for displaying, and recording the authentication information into the learning record corresponding to the learning content; and
wherein the method for providing learning according to global positioning information further comprises the following steps:
each piece of learning data in the learning database further comprising a test type and a test content corresponding to the test type;
a second client establishing a connection to the server, and providing the authentication information for the server;
when the authentication information passes authentication performed by the server, granting a corresponding right for the second client according to the authentication information;
when the server grants a second right according to the authentication information, querying the learning database for the test type corresponding to the learning record and a test content corresponding to the test type;
the server providing the test type and the test content corresponding to the test type for the second client for displaying;
performing selection on the test type and the test content corresponding to the test type, which are displayed by the second client, to generate selection information, and providing the selection information for the server;

the server generating a test paper according to the test type and the test content corresponding to the test type and according to the selection information; and the server providing the test paper for the first client for displaying.

6. The method for providing learning according to global positioning information according to claim 5, wherein in the step that the first client establishing the connection to the server and providing the authentication information and the global positioning information for the server, the global positioning information is obtained through a global positioning system (GPS) or a location based service (LBS) of the first client.

7. The method for providing learning according to global positioning information according to claim 5, wherein the authentication information is pre-stored in the first client, or is input through a user interface provided by the first client.

8. The method for providing learning according to global positioning information according to claim 5, wherein the authentication information is pre-stored in the second client, or is input through a user interface provided by second client.

* * * * *